United States Patent [19]

Ishii

[11] Patent Number: 5,400,687

[45] Date of Patent: Mar. 28, 1995

[54] MUSICAL SCORE DISPLAY AND METHOD OF DISPLAYING MUSICAL SCORE

[75] Inventor: Katsushi Ishii, Iwata, Japan

[73] Assignee: Kawai Musical Inst. Mfg. Co., Ltd., Shizuoka, Japan

[21] Appl. No.: 16,246

[22] Filed: Feb. 11, 1993

Related U.S. Application Data

[63] Continuation-in-part of Ser. No. 894,591, Jun. 5, 1992, abandoned.

[30] Foreign Application Priority Data

Jun. 6, 1991 [JP] Japan .................................. 3-134912

[51] Int. Cl.⁶ ............................................. G09B 15/02
[52] U.S. Cl. .................................................. 84/477 R
[58] Field of Search ................. 84/486, 470 R, 471 R, 84/477 R, 483.1

[56] References Cited

U.S. PATENT DOCUMENTS

| | | | |
|---|---|---|---|
| 3,376,778 | 4/1968 | Musser | 84/483 |
| 4,366,741 | 1/1983 | Titus. | |
| 4,399,731 | 8/1983 | Aoki | 84/470 R X |
| 4,506,587 | 3/1985 | Tanaka | 84/462 |
| 4,614,144 | 9/1986 | Sagara et al. . | |
| 4,779,510 | 10/1988 | Van den Abbeel | 84/464 R |
| 4,976,182 | 12/1990 | Obuchi et al. . | |
| 5,038,659 | 8/1991 | Satoh et al. . | |
| 5,092,216 | 3/1992 | Wadhams . | |
| 5,146,833 | 9/1992 | Lui | 84/462 |
| 5,153,829 | 10/1992 | Furuya et al. | 84/622 X |
| 5,315,911 | 5/1994 | Ochi | 84/477 R |

Primary Examiner—William M. Shoop, Jr.
Assistant Examiner—Jeffrey W. Donels

[57] ABSTRACT

Musical score can be displayed by a simple operation, thus permitting musical score to be easily seen when playing the music. Namely, musical score data of a plurality of pieces of music are stored in the musical score display, and when a piece of music is selected, the musical score data of this piece of music is read out and displayed, and thus musical score data can be easily selected and displayed. Musical score data that has been read out and displayed can be changed according to a feeding of a page. The displayed musical score, and the musical score page feed can be easily effected while playing the music. As a result, displayed musical score is changed according to a progress of a musical repeat for example Da Capo, Dal Segno, Al Fine, bis, etc.

23 Claims, 14 Drawing Sheets

FIG. 4A
MUSIC DATA
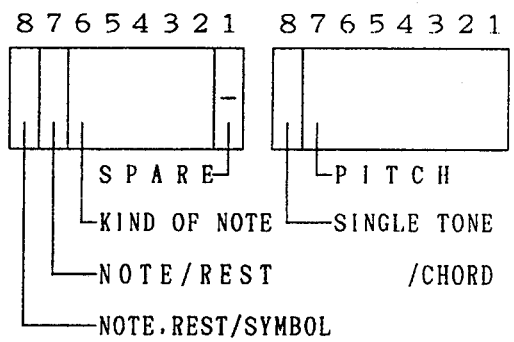
FIG. 4B
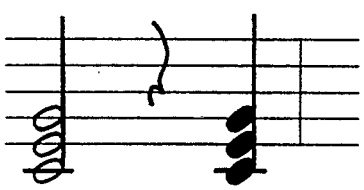
FIG. 4C
| | 8 7 6 5 4 3 2 1 | 8 7 6 5 4 3 2 1 |
|---|---|---|
| NOTE | 0 0 0 0 0 1 0 0 | 0 1 0 0 1 0 0 0 |
| NOTE | 0 0 0 0 0 1 0 0 | 0 1 0 0 1 0 1 0 |
| NOTE | 0 0 0 0 0 1 0 0 | 0 1 0 0 1 1 0 0 |
| NOTE | 0 0 0 0 0 1 0 0 | 0 1 0 0 1 1 0 1 |
| BAR  | 1 0 0 0 0 0 0 0 | * * * * * * * * |
| NOTE | 0 0 0 0 0 0 1 0 | 1 0 1 1 1 1 0 0 |
| NOTE | 0 0 0 0 0 0 1 0 | 1 1 0 0 0 0 0 0 |
| NOTE | 0 0 0 0 0 0 1 0 | 1 1 0 0 0 0 1 1 |
| REST | 0 1 0 0 0 1 0 0 | ——— |
| NOTE | 0 0 0 0 0 1 0 0 | 1 0 1 1 1 1 0 0 |
| NOTE | 0 0 0 0 0 1 0 0 | 1 1 0 0 0 0 0 0 |
| NOTE | 0 0 0 0 0 1 0 0 | 1 1 0 0 0 0 1 1 |
| BAR  | 1 0 0 0 0 0 0 0 | * * * * * * * * |

TITLE DATA DISPLAY ROUTINE

MUSICAL SCORE DATA
DISPLAY ROUTINE

FIG. 7

|  | 0 | 1 | 2 | 3 | 4 | 5 | 6 | 7 bit |
|---|---|---|---|---|---|---|---|---|
| 0 | — | SYMBOL | NOTE | REPEAT | \multicolumn{4}{c}{TRUCK (BAR)} | | | | byte

0: — | SYMBOL | NOTE | REPEAT | TRUCK (BAR)

1:
SYMBOL  — KIND
NOTE    — KIND (GATE TIME)
REPEAT  — KIND

2:
SYMBOL  — NOTHING
NOTE    — PITCH (KEY NUMBER)
REPEAT  — MUSICAL PROGRESS
          JUMP (HIGH-ORDER)

3:
SYMBOL  — TIME FROM BAR
NOTE    — POSITION (STEP TIME)
REPEAT  — MUSICAL PROGRESS
          JUMP (LOW-ORDER)

| Register | Data |
|---|---|
| MODE REGISTER 31 | mode flag data |
| DISPLAY TOP REGISTER 32 | display top data DT |
| REPEAT TOP REGISTER 33 | repeat top data RT |
| REPEAT END REGISTER 34 | repeat end data RE |
| READING BAR REGISTER 35 | reading bar data BR |
| MUSICAL SCORE END REGISTER 36 | musical score end data ME |
| FLAG REGISTER 37 | display top flag data DTF<br>display end flag data DEF<br>repeat flag data RF |
| TEMPO BEAT REGISTER 38 | tempo beat data TB |
| TIME COUNTER 39 | time count data TM |
| PLAYBACK BUFFER REGISTER 40 | musical score data |

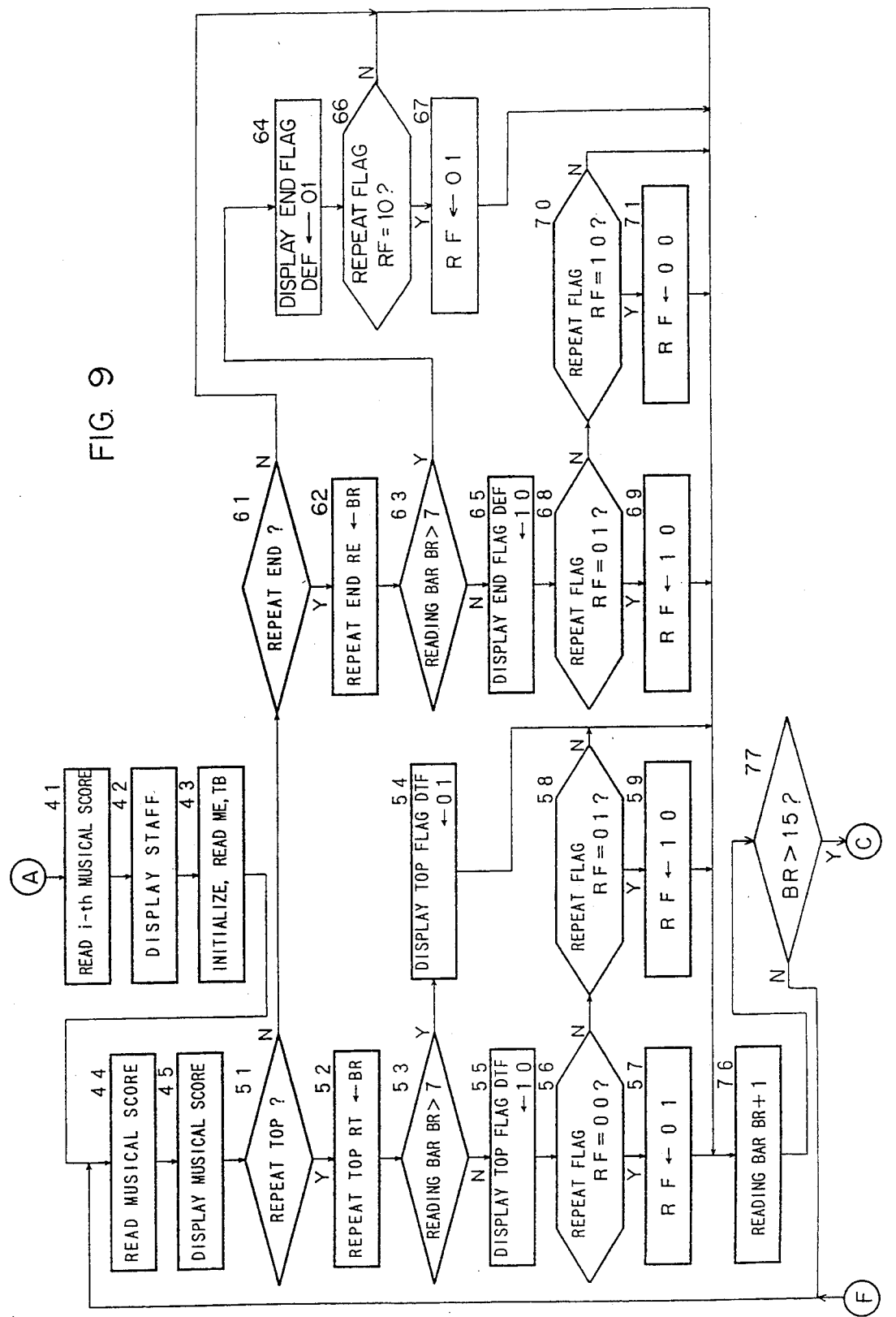

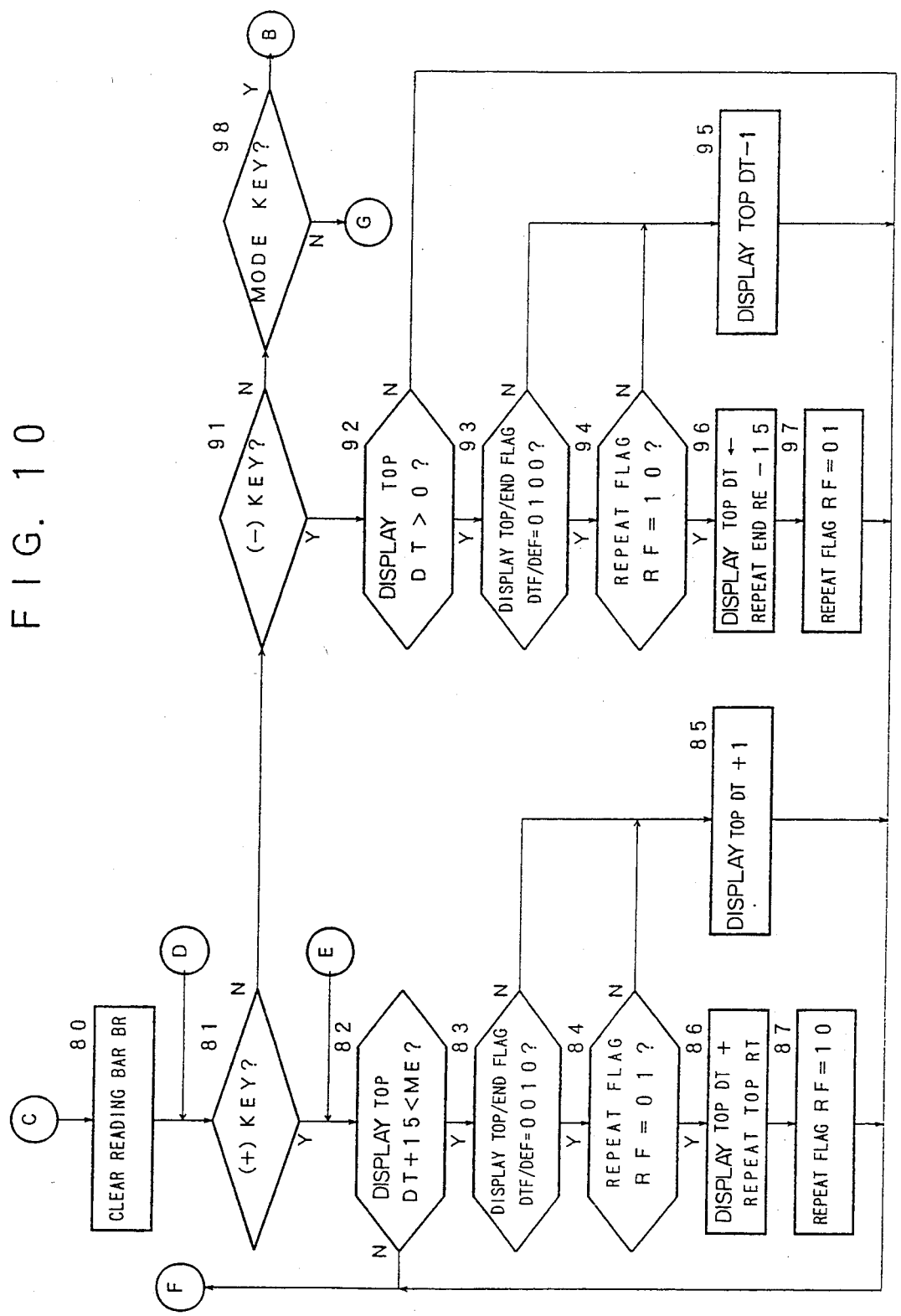

MUSICAL SCORE DISPLAY AND METHOD OF DISPLAYING MUSICAL SCORE

This application is a continuation-in-part of application Ser. No. 07/894,591, filed on Jun. 5, 1992, now abandoned, the entire contents of which are hereby incorporated by reference.

BACKGROUND OF THE INVENTION

1. Field of the Invention

The present invention relates to a musical score display and a method of displaying musical score, and more particularly, to an apparatus and a method of electrically displaying musical score and the like.

2. Description of the Background Art

Conventionally, sheet music is widely used, and books of such sheet music (hereinafter, book) are formed by binding the sheets together. The conductor of an orchestra, for example, will place such a book i.e., score, on the conductor's stand, and turn the pages of the book in accordance with the progress of the piece of music being played. Also, when playing the piano, violin, and drums, etc., the pages of the music book are turned with the progress of the piece of music being played.

Nevertheless, it is difficult to turn the pages of the book while playing a piece of music. Particularly, this is difficult for a piano player, whose hands are fully occupied by the operation of the keys of the piano and thus occasionally the pages of the book must be turned by a helper seated beside the player. From another aspect, books made of paper are easily stained and torn, to thus make it difficult to recognize the musical score, since they are used many times.

SUMMARY OF THE INVENTION

An object of the invention is to provide a musical score display and a method of displaying musical score by which the musical score can be easily seen when playing the music, and which is conveniently portable and allows easy recognition of the musical score at all times.

According to the invention, musical score data is stored in the musical score display and is read out and displayed according to musical score data display instructions. The display of musical score thus can be obtained by merely instructing the same. Further, musical score data that has been read out and displayed is changed according to a displayed musical score change instruction, and thus the displayed musical score can be changed without trouble while playing the music. Furthermore, the display of musical score data is effected electrically in such a manner that musical score data is stored, read out, displayed, and changed, and thus the musical score itself is always readable regardless of the number of times the display is used. Also, it is possible to reduce the size of the display, to make it conveniently portable.

Then, displayed musical score can be changed according to a progress of a musical repeat for example Da Capo, Dal Segno, Al Fine, bis, etc.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIGS. 4A to 4C are views showing musical score data;

FIG. 7 is a view showing another example of the musical score data;

FIG. 8 is a view showing registers in a RAM 6;

FIGS. 9, 10, and 11 are flowchart showing a musical score data display routine and autoplay routine;

DESCRIPTION OF THE PREFERRED EMBODIMENTS

Summary of the Embodiment

After a list of musical titles has been displayed (steps 04 and 05), by selecting a desired piece of music (steps 07 to 14), the musical score data of the selected piece of music is displayed (steps 21 to 24), and a page feed of the displayed musical score is effected by operating a forward key 13 or a reverse key 14, etc. (steps 25 to 31), and thus the musical score can be progressively displayed.

Figure 13A:
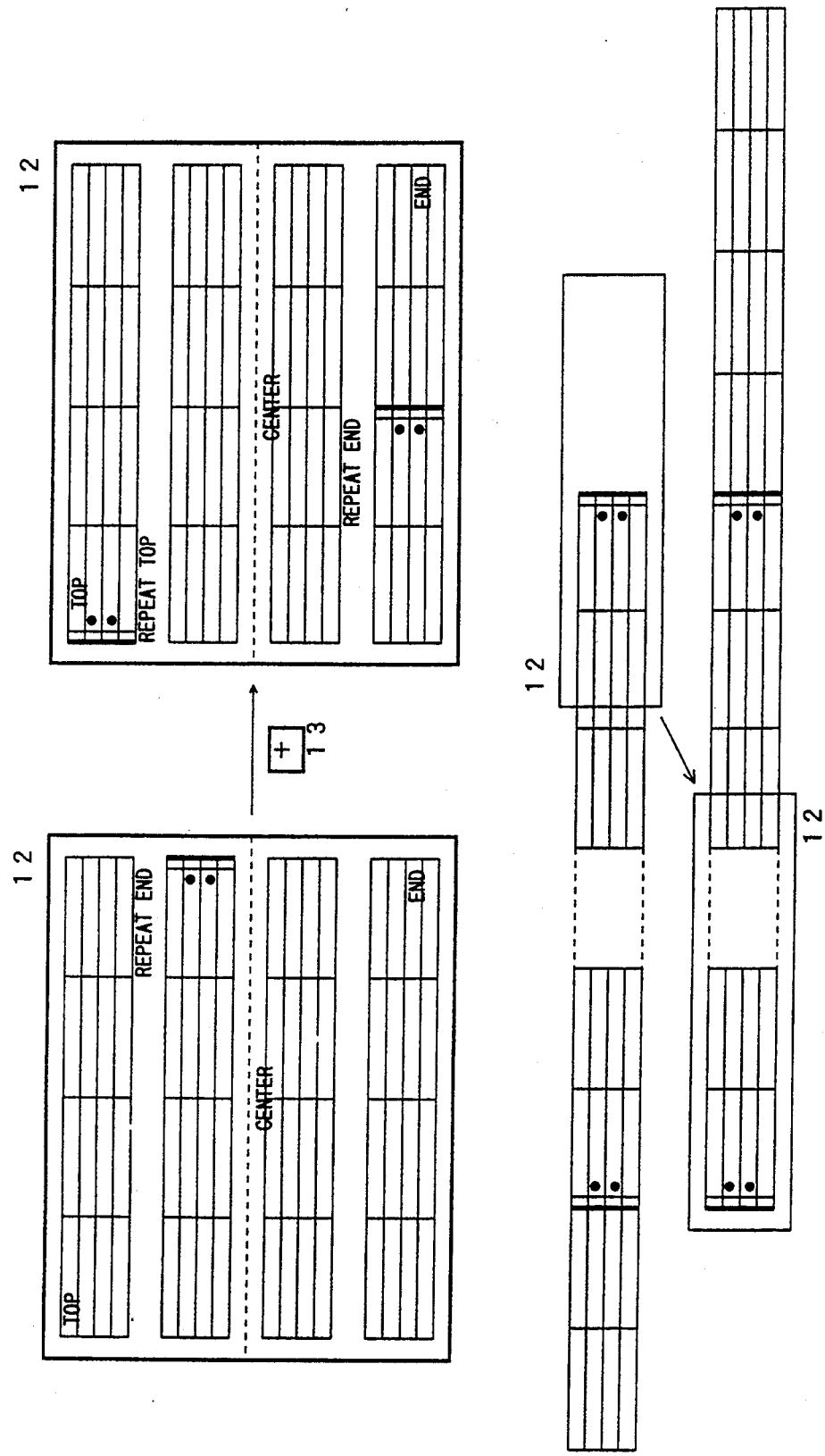
FIGS. 13A and 13B are views showing changing of displayed musical score including either repeat top symbol or repeat end symbol.

Then, in case the repeat top symbol is not shown on the display 12, the repeat end symbol is shown on the first half area of the display 12 (step 83) and the repeat progress is the first time of the repeat period (step 84), if the forward (+) key 13 is turned on (step 81), the repeat top symbol appears at the top of the display 12 as shown FIG. 13A (step 86 and steps 44 to 77). Further, in the case where the repeat end symbol is not shown on the display 12, the repeat top symbol is shown on the second half area of the display 12 (step 93) and the repeat progress is the second time of the repeat period (step 94), if the reverse (−) key 14 is turned on (step 91), the repeat end symbol appears at the end of the display 12 as shown FIG. 13B (step 96 and steps 44 to 77). Therefore the displayed musical score is changed according to the progress of the musical repeat.

Appearance of Musical Score Display 11

Figure 1:
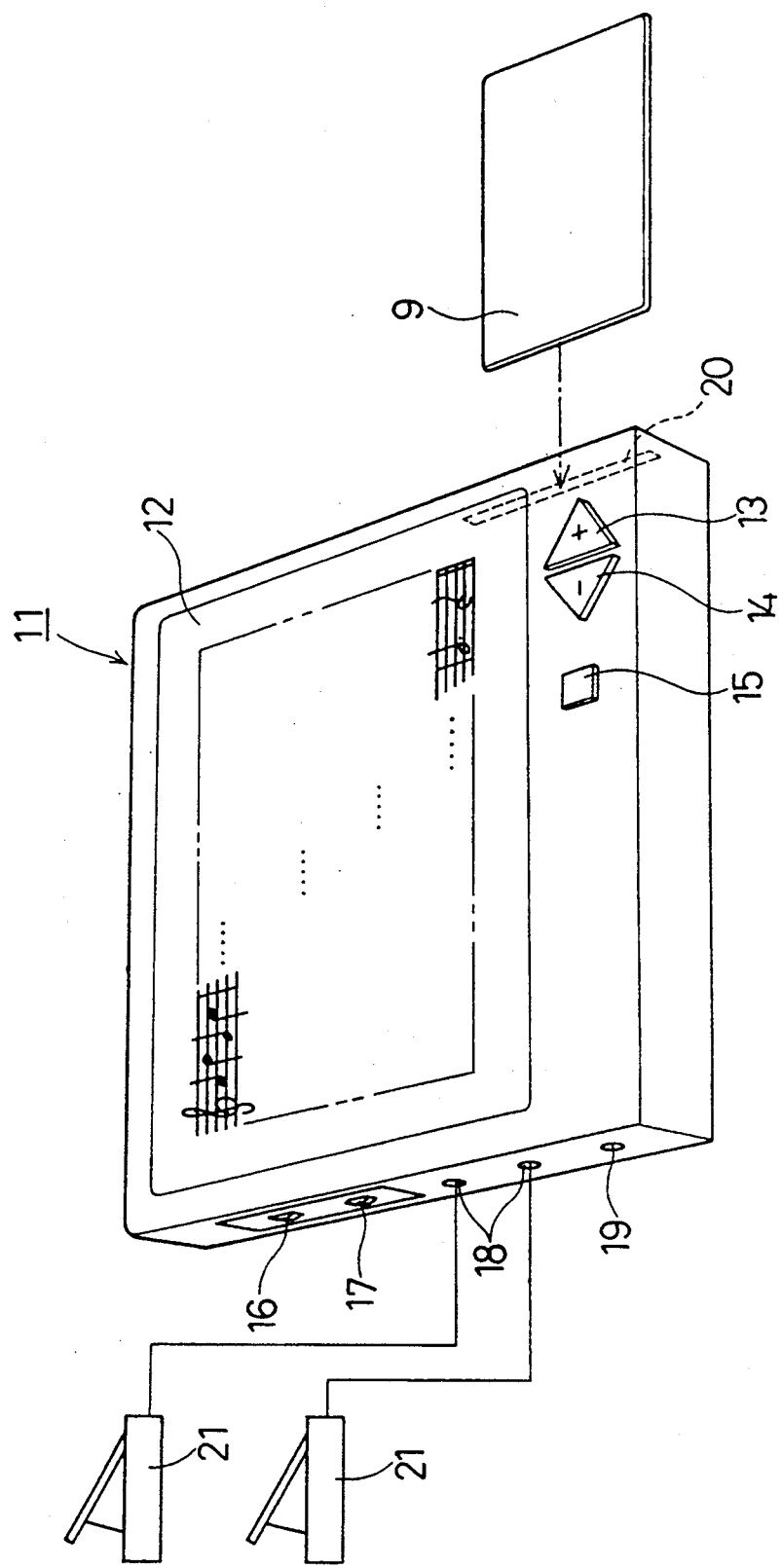
FIG. 1 is a perspective view showing a musical score display 11.

FIG. 1 shows the musical score display 11 provided on an electronic musical instrument. The musical score display 11 has the shape of a rectangular plate, and a rectangular liquid crystal display 12 is provided at the front side thereof. The musical score display 11 is driven by a bit map display system, and can display a list of musical titles or musical score of the pieces of music per se. The front side of the musical score display 11 also has a forward (+) key 13, a reverse (−) key 14 and a mode key 15, these keys being provided beneath the liquid crystal display 12. The left end face of the musical score display 11 is provided with a display contrast knob 16, a backlight knob 17, foot switch jacks 18, and a power source jack 19. The right end face of the musical score display 11 is provided with a card slot 20.

The forward and reverse keys 13 and 14 are used to change the page of musical score displayed by the liquid crystal display 12 to the immediately succeeding and immediately preceding pages of musical score, respectively. These keys are also used to shift a cursor displayed on the liquid crystal display 12 upward and downward. The cursor is displayed in correspondence to one of a plurality of pieces of music shown in the list of titles displayed by the liquid crystal display 12. The mode key 15 is used to change the contents displayed by the liquid crystal display 12. Namely, if the mode key 15 is turned on while the list of titles is displayed, musical score data of the piece of music indicated by the cursor is displayed, and if the mode key 15 is turned on while musical score data is displayed, the list of titles is again displayed.

The contrast of display on the liquid crystal display 12 is controlled by a display contrast knob 16, and the brightness of the liquid crystal display 12 is controlled by a back light knob 17. Foot switches 21 are connected via connection cable to foot switch jacks 18. The foot switch 21 connected to the upper foot switch jack 18 has the same function as the forward key 13, and the foot switch 21 connected to the lower foot switch jack 18 has the same function as the reverse key 14. A cord from a DC converter for power supply is connected to a power source jack 19.

A battery or a recharging battery is accommodated in the musical score display 11. A memory card 9 such as a ROM card or a RAM card is inserted into the card slot 20. Musical score data is stored in the memory card 9, and the musical score data is read out and displayed by the liquid crystal display 12. When the memory card 9 is inserted in the card slot, 20, a power switch of spring type is turned on. When the memory card 9 is taken out, the power switch is turned off.

Electric Circuit

Figure 2:
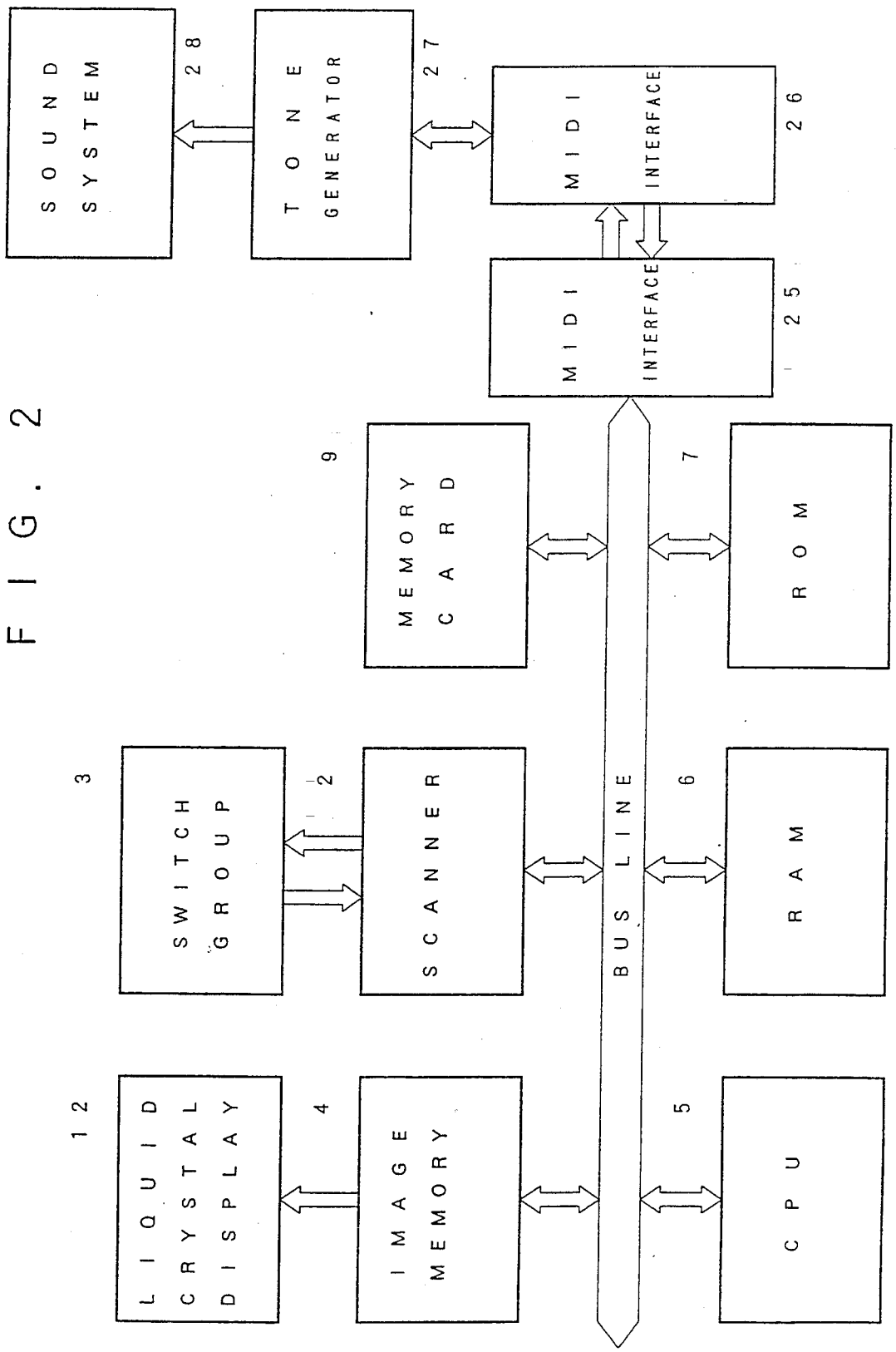
FIG. 2 is a block diagram showing the electric circuit of the musical score display 11.

FIG. 2 shows the electric circuit of the musical score display 11. The key switches 13 to 15 in the switch group 1, and the knobs 16 and 17 and a foot switches 21, are scanned by a scanner 2. This scanning provides data indicating an "on" or "off" state of the individual keys and switches, and the obtained data is written to a RAM 6 by a CPU 5. The written data are compared with data previously stored in the RAM 6 indicating an "on" or "off" state of the keys and switches, and thus a detection (judgment) of an "on" or "off" event for each key and each switch is effected by the CPU 5. The scanner 2 may be replaced with a latch or the like, for latching "on"/"off" data in the latch before supplying same to the CPU 5.

In addition to the above data, various routine data, and a list of title data and musical score data, are stored in the RAM 6 for display by the liquid crystal display 12. Programs corresponding to flowcharts, to be described later, executed by the CPU 5 and programs corresponding to other routines are stored in ROM 7, which also stores musical score graphic data indicating a musical score display pattern corresponding to individual musical score data, and character data corresponding to character codes of title data of pieces of music and so forth.

The title data of pieces of music and the musical score data noted above are stored in a memory card 9, and this data is read out and written to the RAM 6 by the CPU 5. The CPU 5 can read out the written data for conversion to the musical score graphic data noted above to write same in an image memory 4 for display by the liquid crystal display 12.

The RAM 6 includes registers I, M, N, X and so forth. Cursor point data i is stored in the register I, and this cursor point data i represents the piece of music indicated by the cursor among the titles of pieces of music displayed as a list by the liquid crystal display 12. The cursor point data i is processed to calculate coordinate data of the leading cursor position, and in accordance with the coordinate data, graphic data of the cursor is written to the image memory 4. In the above processing, assuming one character to be 24×24 dots, and an inter-line spacing of 24 dots, X=i (cursor point data) i×(24+24)+a and Y=b, a and b being the respective distances form coordinates X=O and Y=O to the coordinates of the character in the first row and in the first column. The graphic data of the cursor may be, for example, a 2-row 24-column dot line.

Displayed first bar data m is stored in the register M. The displayed first bar data m represents the first bar number of the musical score displayed by the liquid crystal display 12. Displayed bar data n is stored in the register N. The displayed bar data n represents the number of all bars of the musical score displayed by the liquid crystal display 12. Last bar data x is stored in the register X. The last bar data x represents the last bar number of a piece of music.

As shown above, a musical score of a piece of music is displayed electrically, and thus it is not possible for the musical score per se to become difficult to recognize. Further, the size of the musical score display 11 itself may be reduced, to make it conveniently portable.

The musical score data is sent via MIDI (musical instruments digital interface) interface 25 and 26 to tone generator 27, a musical tone data is generated from the tone generator 27 and sounded in sound system 28. The MIDI interface 26, tone generator 27 and sound system 28 are set up in an electronic musical instrument connected the musical score display 11. Then, the musical score data is also sent via the MIDI interface 25 and 26 from the electronic musical instrument to the musical score display 11.

Stored Contents in Memory Card 9

Figure 3:
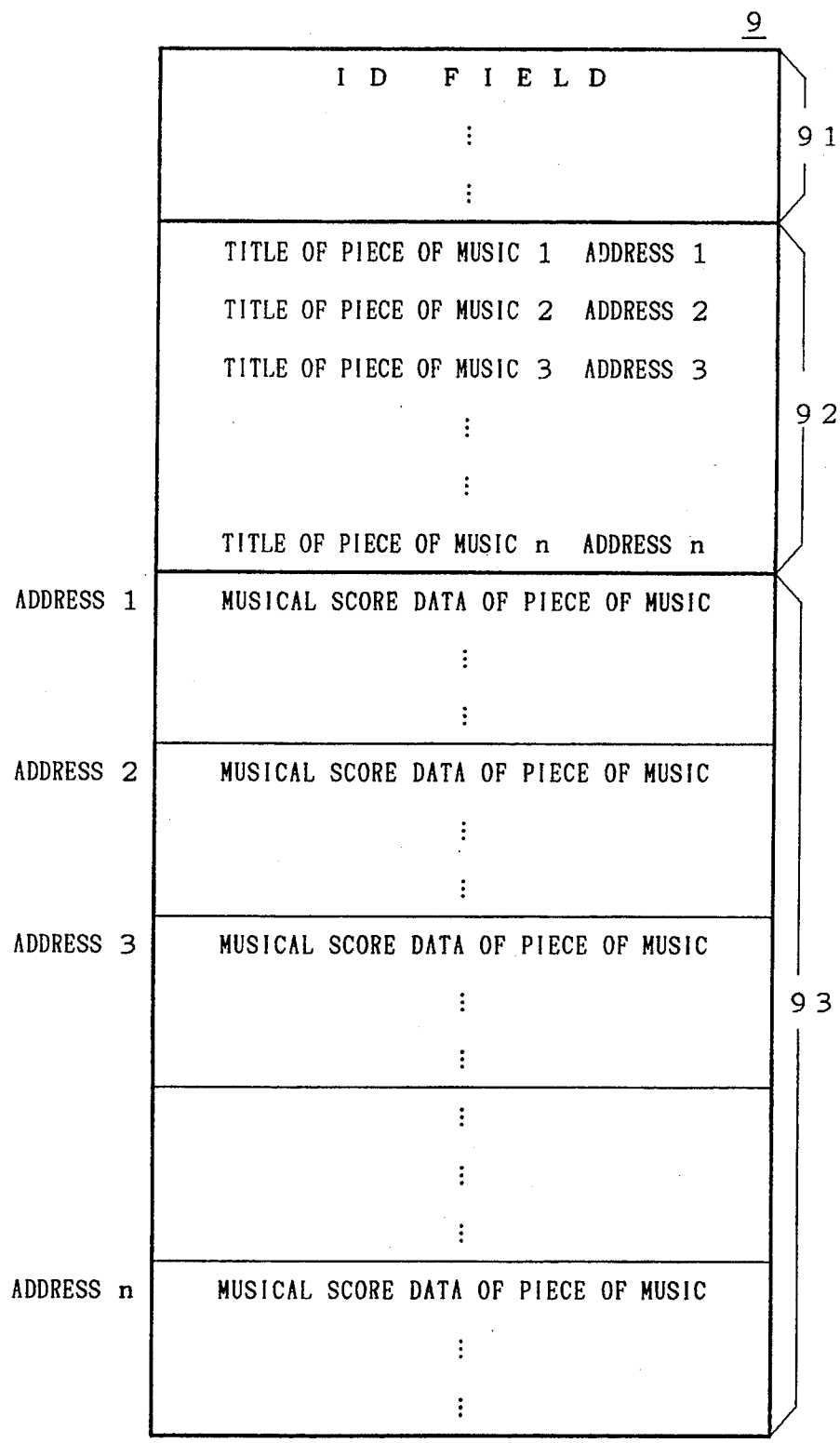
FIG. 3 is a view showing contents stored in a memory card 9.

FIG. 3 shows the contents stored in the memory card 9. Namely, the memory card 9 has an ID field 91, a title of piece of music address table 92, and a musical score memory area 93. Data such as a bank number, sector number and head number are stored in the ID field 91. Total pieces of music data, the title data of pieces of music and first address data concerning the musical score data of pieces of music etc., are stored in the title of piece of music address table 92. The musical score data of the individual pieces of music are stored in the musical score memory area 93.

Contents of Musical Score Data

FIGS. 4A to 4C show the contents of musical score data. The musical score data represents symbols or the like of notes, rests, bar lines and so forth. As shown in FIG. 4A, the musical score data is 2-byte data, and in the high-order byte, the most significant bit represents a rest/note ("0") or symbol ("1"). The symbol is a bar line, sharp, flat, or natural, etc. The next significant bit represents a note ("0") or rest ("1"). The following 5 bit data represents the kind of note, kind of rest, and king of symbol. The least significant bit in this byte is a spare ("0"). In the low-order byte, the most significant bit represents a note of a single tone ("0") or a chord ("1"). The following 7 bit data represents a kinds of pitches and a number of bars. The represented pitch is the pitch of a note or the position (pitch) of a displayed position such as a sharp and flat, as noted above.

The kinds of notes, as shown in FIGS. 4B and 4C, are a whole note "00000(0)", half-note "000001(1)", quarter note "00010(2)", eighth note "00011(3)" and so forth; the kinds of rest notes are a whole rest "00000(0)", half-rest "00001(1)", quarter rest "00010(2)", eighth rest "0011(3)" and so forth; and the kinds of symbols are a bar line "00000(0)", double bar "00001(1)", sharp "00010(2)", flat "00011(3)", natural "00100(4)" and so forth.

The kinds of pitches, as shown in FIGS. 4B and 4C, are C4 "0111100", C#4 "0111101", D4 "0111110", D#4 "0111111", E4 "1000000", ..., C5 "1001000", C#5 "1001001", D5 "1001010", ... The number of bars are the end of the first bar "0000001", the end of the second bar "0000010" ....

Display Routine

Figure 5:
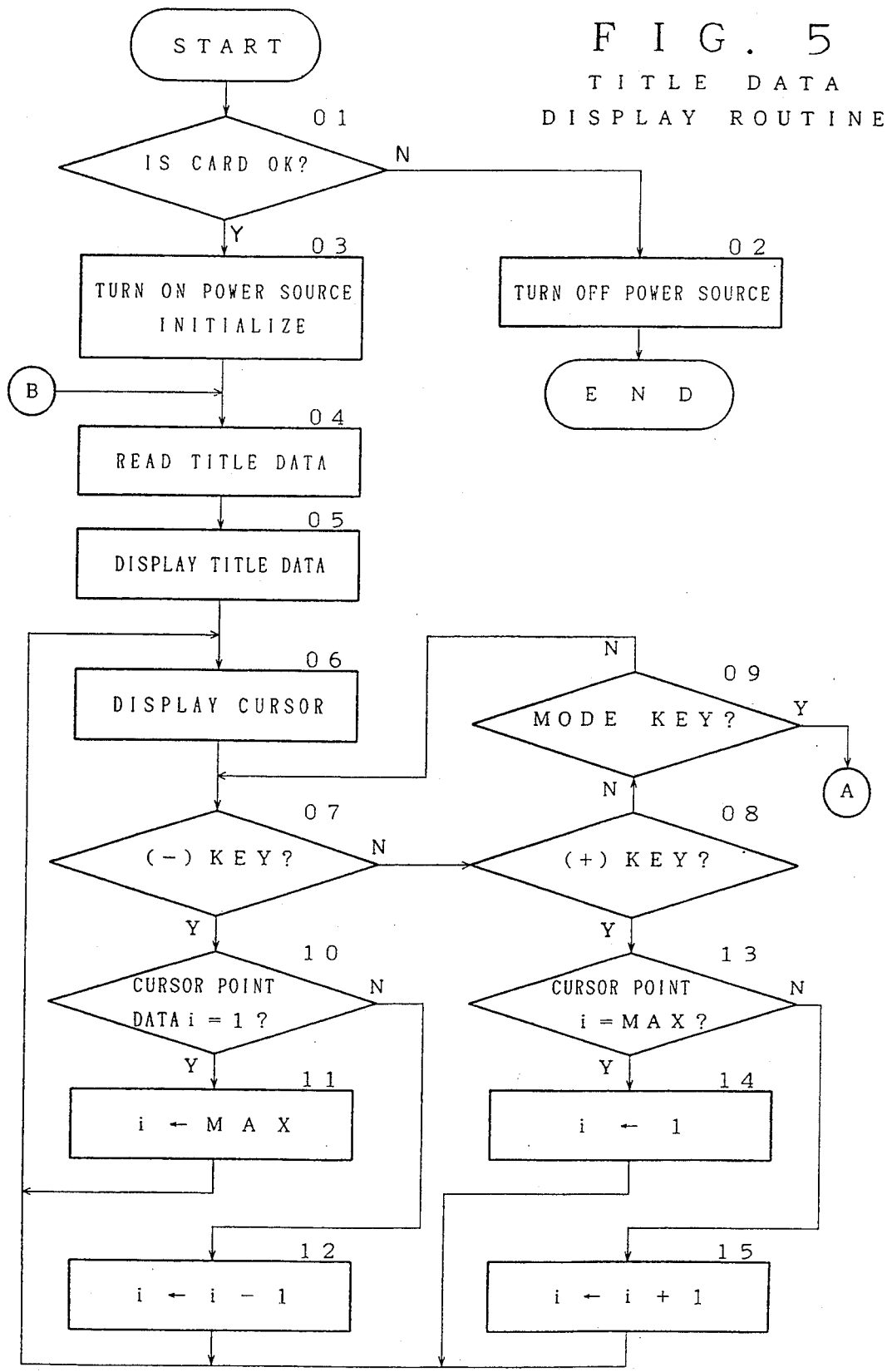
FIG. 5 is a flowchart showing a title data of pieces of music display routine.
Figure 6:
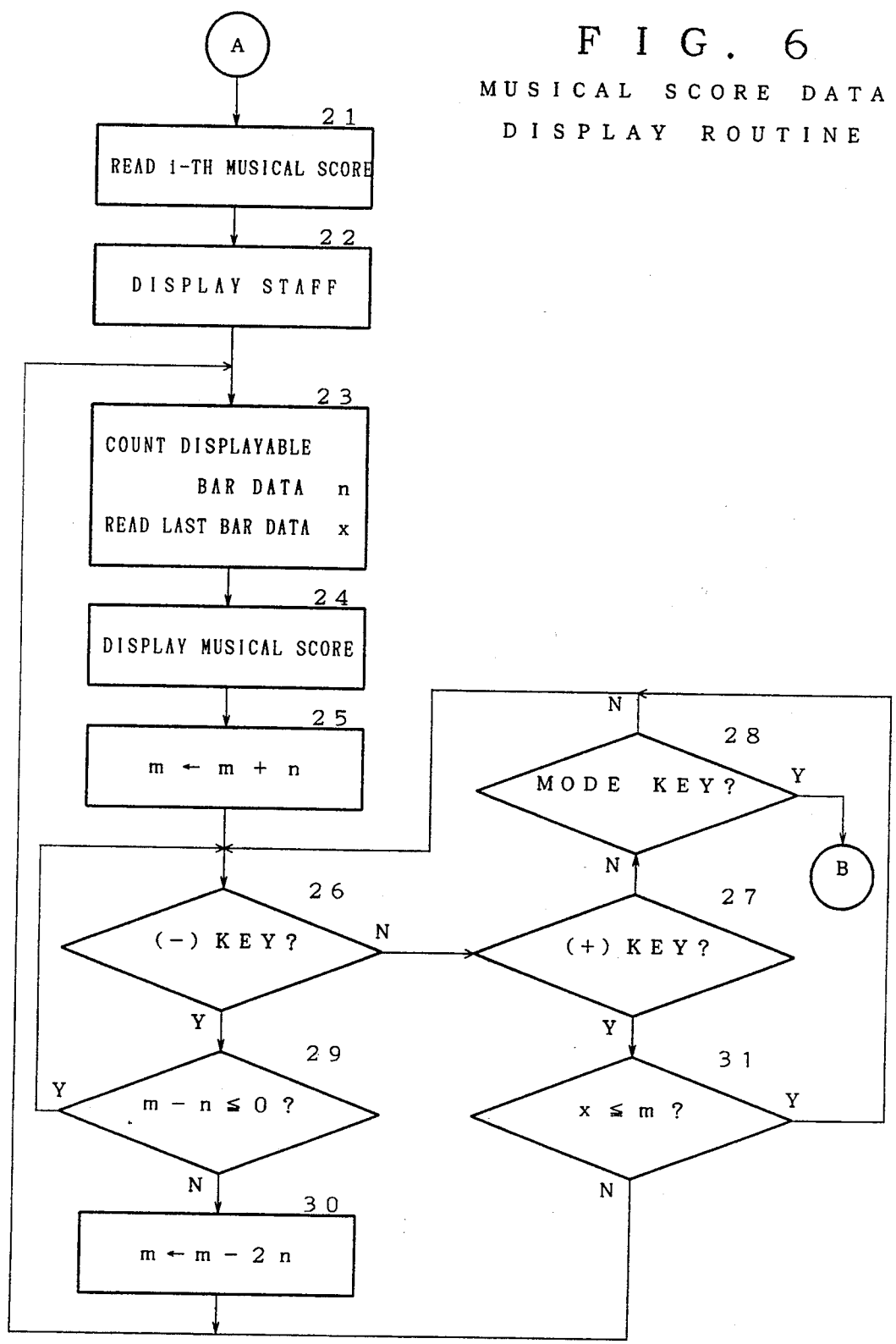
FIG. 6 is a flowchart showing a musical score data display routine.

FIGS. 5 and 6 are flowcharts showing the title data of pieces of music and a musical score data of pieces of music display routine. The display routine is started when the power source switch is turned on after the insertion of the memory card 9 to the card slot 20, and is executed by the CPU 5. When the routine is started, the state of the inserted memory card 9, the stored contents of the ID field 91 in the memory card 9 and so forth are checked to determine whether the data can be read out (step 01). If the data cannot be read, the power source is turned off (step 02). It is possible to effect an error display in step 02.

If it is found in step 01 that the data can be read out, the power source is turned on, and an initialization is effected in which data values in the individual registers I, M, N and X in the RAM 6 are set to "1" (step 03). Then, title data are read from the title of piece of music address table 92 in the memory card 9 and written to the RAM 6 (step 04). The title data of piece of music thus written are converted, via the ROM 7, into character data to be written in the image memory 4 and displayed by the liquid crystal display 12 (step 05). Then, cursor display data is written under the character data of an i-th title of pieces of music, and the cursor is displayed (step 06). The cursor point data i of the i-th piece of music has been stored in the register I of the RAM 6, and in the initialized state attained in step 03, the cursor point data i is i=1. The cursor is thus displayed to indicate the 1-st title of piece of music.

Then, it is detected (determined) whether the reverse (−) key 14 or the foot switch 21 having the same function is turned on (step 07), whether the forward (+) key 13 or the foot switch 21 having the same function is turned on (step 08), and whether the mode key 15 is turned on (step 09). If the reverse key 14 or the like is turned on, in the cursor point data state of i=1 (step 10), the maximum value, i.e., the number of all pieces of music, is set as the cursor point data i (step 11). If the cursor point data is not i=1 (step 10), "1" is subtracted from the cursor point data i (step 12). The number of all pieces of music has been stored in the title of piece of music address table 92. Subsequently, the routine returns to step 06, and as a result, the cursor on the liquid crystal display 12 is shifted to indicate the immediately preceding title of piece of music.

If the forward key 13 or the like is turned on, in the cursor point data i at the maximum value (step 13), the cursor point data i is changed to "1" (step 14). If the cursor point data i is not at the maximum (step 13), the cursor point data i is incremented by "1" (step 15), and the routine returns to step 06. Thus, the cursor on the liquid crystal display 12 is shifted to indicate the immediately succeeding title of piece of music. If the mode key 15 is turned on, the musical score of piece of music indicated by the cursor is displayed, in steps 21 and 31, to be described later.

In the display routine, first address data of the piece of music indicated by the cursor point data i in the register I of the RAM 6 is read from the RAM 6 and set in an address counter (not shown), and corresponding musical score data is read from the memory card 9 and written to the RAM 6 (step 21). Then, graphic data representing the staff, G clef, etc., are read from the ROM 7 and written to the image memory 4 (step 22).

Then, the number of bars able to be displayed by the liquid crystal display 12 are counted, and the count n is written in the register N. Further, the last bar data x is read from the end of the musical score data and written to the register X (step 23). When a musical score can be displayed on 4 lines each having 4 bars by the liquid crystal display 12, the displayable bar data count n is n=16. As the last bar data x, the bar number data in the bar line data at the end of the musical score data may be used. The musical score data subsequent to this bar line, up to the bar line for the displayable bar data n, is read from the RAM 6, converted to musical score graphic data, and written to the image memory 4 (step 24), and the displayable bar data n is appended to the displayable first bar data m (step 25).

Then, it is detected (determined) whether the reverse key 14 or the foot switch 21 having the same function is turned on (step 26), whether the forward key 13 or the foot switch 21 having the same function is turned on (step 27), and whether the mode key 15 is turned on (step 28). If the reverse key 14 or the like is turned on, the displayable bar data n is subtracted from the displayable first bar data m. If the resultant data is "0" or below (step 29), the routine returns to step 26, but if the data is above "0" double the displayable bar data n is subtracted from the displayable first bar data m (step 30). The routine then returns to steps 23 and 24 for a musical score display routine based on the new displayable first bar data m. As a result, the musical score data of the immediately preceding page can be displayed by turning on the reverse key 14 or the like.

If the reverse key 14 or the like is turned on, and if at this time the displayable first bar data m is greater than the last bar data x (step 31), the routine returns to step 26. If the displayable first bar data m is less than the last bar data x, the routine returns to steps 23 and 24 for musical score display routine based on the new displayable first bar data m. As a result, the musical score data of the immediately succeeding page can be displayed by turning on the forward key 13 or the like. Further, if the mode key 15 is turned on, the routine returns to step 07 to again effect a display of the list of musical titles for another selection of a piece of music.

Contents of Musical Score Data

FIG. 7 shows another example of the musical score data. The musical score data represents notes, rests, bar lines, etc. The musical score data is 4-byte data. The first 4 bits of the highest-order one byte represents a kind of the musical score data. The second bit of the 4 bits represents whether the musical score data is a musical symbols or note. The third bit of the 4 bits represents whether the musical score data is the notes or not. The fourth bit represents whether the musical score data is a repeat symbol or not. The second 4 bits of the high-order one byte represent a truck number.

The next high-order byte represents a kind of the symbols, the notes, and the repeat symbols. For instance the kind of the symbols are bars, beats, clefs, tempos, expressions, graces, etc., the kind of the notes are half note, quarter note, eighth note, etc. (gate time), the kind of repeat symbols are Da Capo, Dal Segno, Al Fine, bits, etc.

The third next high-order byte represents nothing at the symbols, tone pitches (key number) at the notes, and a high-order address data into which musical repeat progress jumps at the repeat symbols. The last high-order byte represents a length of musical time from the bars (step time) at the symbols and the notes, and a low-order address data into which musical repeat progress jumps at the repeat symbols.

Registers (RAM 6)

FIG. 8 shows registers in the RAM 6. Mode flag data is stored in a mode register 31. The mode flag data represents when the musical score is displaying, when a musical performance is autoplaying, etc. The mode flag data which represents when the musical score is displaying indicates the on/off of the mode key 15, the mode flag data which represents when the musical performance is autoplaying indicates the on/off of an autoplay key (not shown). Display top data DT is stored in a display top register 32, the display top data DT represents an order of a top bar displayed on the liquid crystal display 12 in the whole musical score data.

Repeat top data RT is stored in a repeat top register 33, the repeat tp data RT represents an order to a repeat top symbol (bar) from the top bar displayed on the liquid crystal display 12. Repeat end data RE is stored in a repeat end register 34, the repeat end data RE represents an order of a repeat end symbol (bar) from the top displayed on the liquid crystal display 12.

Reading bar data BR is stored in a reading bar register 35, the reading bar data BR represents an order of reading and displaying bar from the top bar displayed on the liquid crystal display 12. Musical score end data ME is stored in a musical score end register 36, the musical score end data ME represents a number of all bars of the musical score data, the musical score end data ME is recorded in the end bar data of the musical score data or the top of the musical score data and is read from the end or the top and is written to the register 36.

Display top flag data DTF, display end flag data DEF and repeat flag data RF are stored in a flag register 37. The display top flag data DTF represents whether the repeat top symbol is displayed on the first half area of the liquid crystal display 12 ("10"), the repeat top symbol is displayed on the second half area of the liquid crystal display 12 ("01") or the repeat top symbol is not displayed on the liquid crystal display 12 ("00"). Display end flag data DEF represents whether the repeat end symbol is displayed on the first half area of the liquid crystal display 12 ("10"), the repeat end symbol is displayed on the second half area of the liquid crystal display 12 ("01") or the repeat end symbol is not displayed on the liquid crystal display 12 ("00"). The repeat flag data RF represents whether a center of the liquid crystal display 12 enters to the first time of a repeat period in the musical score ("01"), the second time of the repeat period ("10") or is out of the repeating period ("00"). The repeat period is bars between the repeat top bar and the repeat end bar.

Tempo beat data TB is stored in a tempo beat register 38, the tempo beat data TB represents a musical time of one bar, the tempo beat data TB is recorded in the top of the musical score data and is read from the top and written to the register 38. Time count data TM in time counter 39 is incremented by "1" by CPU 5 whenever a clock signal $\phi$ is inverted to a high level. When the time count data TM equals to the tempo beat data TB, the time count data TM is cleared. An interrupt routine to be described later is executed whenever the clock signal $\phi$ is inverted to the high level. It is possible for a frequency of the clock signal $\phi$ to correspond to predetermined tempo data.

The musical score data (key number data, gate time data, step time data, bar mark data etc.) is set to a playback buffer register 40 during autoplay mode. A plurality of the musical score data can be set to the playback buffer register 40.

Display Routine of Musical Score and Autoplay Routine

Figure 11:
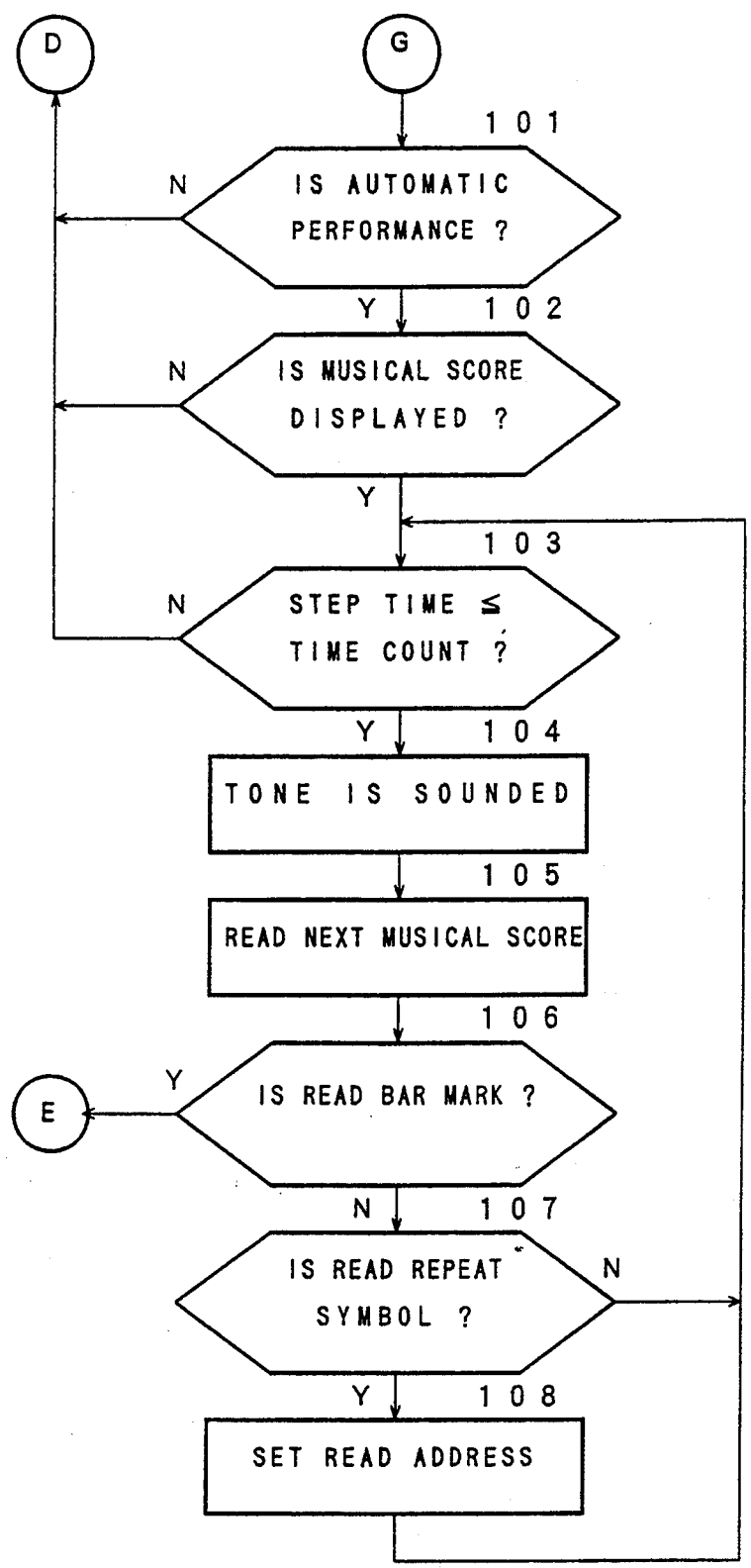

FIGS. 9, 10 and 11 show a flowchart of a display routine of the musical score data and an autoplay routine. The flowchart is joined to the flowchart of FIG. 5 at A point and B point. First address data of the piece of music indicated by the cursor point data i in the register I of the RAM 6 is read from the RAM 6 and set in an address counter (not shown), and corresponding musical score data is read from the memory card 9 and written to the RAM 6 (step 41). Then, graphic data representing the staff, G clef, etc., are read from the ROM 7 and written to the image memory 4 (step 42).

Then, registers in the RAM 6 except the mode register 31 are cleared, the tempo beat data TB and the musical score end data ME in the musical score data are read from RAM 6 and written to the tempo beat register 38 and musical score end register 36 (step 43). Musical score data according to the cleared reading bar data BR is read from the RAM 6 (step 44), converted to musical score graphic data, written to the image memory 4 and displayed on the liquid crystal display 12 (step 45). Further reading and displaying of the musical score data are repeated for 16 bars which can be displayed on the liquid crystal display 12 (steps 76 and 77).

If the read and displayed musical score data is the repeat top symbol (step 51), the reading bar data BR at this time is written to the repeat top register 33 as the repeat top data RT (step 52). Next, if the reading bar data BR is more than "7" i.e. the repeat top symbol is displayed on the second half area of the liquid crystal display 12 (step 53), the display top flag data DTF is changed to "01" (step 54). If the reading bar data BR is not more than "7", the top repeat symbol is displayed on the first half area of the liquid crystal display 12 (step 53), and the display top flag data DTF is changed to "10" (step 55).

Then, if the repeat flag data RF is "00", i.e. the center of the liquid crystal display 12 is out of the repeating period (step 56), the repeat flag data RF is changed to "01" i.e. musical repeat is progressed for the first time within the repeat period (step 57), if the repeat flag data RF is "01", i.e. the center of the display 12 enters to the first time of the repeat period (step 58), the repeat flag data RF is changed to "10", i.e. musical repeat is progressed to the second time of the repeat period (step 59).

Further, if the read and displayed musical score data is the repeat end symbol (step 61), the reading bar data BR at this time is written to repeat end register 34 as the repeat end data RE (step 62). Next, if the reading bar data BR is more than "7", i.e. the repeat end symbol is displayed on the second half area of the liquid crystal display 12 (step 63) and the display end flag data DEF is changed to "01" (step 64). If the end repeat symbol is displayed on the first half area of the liquid crystal display 12 (step 63), the display end flag data DEF is change to "10" (step 65).

Then, if the repeat end symbol is displayed on the second half area of the liquid crystal display 12 (step 64) and the repeat flag data RF is "10" i.e. the center of the display 12 enters for the second time within the repeat period (step 66) and the repeat flag data RF is changed to "01" i.e. musical repeat is progressed for the first time within the repeat period (step 67). And if the repeat end symbol is displayed on the first half area of the display 12 (step 65) and repeat flag data RF is "01" i.e. the center of the display 12 enters for the first time within the repeat period (step 68), the repeat flag data RF is changed to "10" i.e. musical repeat is progressed for the second time within the repeat period (step 69). If repeat flag data RF is "10" i.e. the center of the display 12 enters for the second time within the repeat period (step 70), the repeat flag data RF is changed to "00" i.e. musical repeat progress is out of the repeat period (step 71). Therefore, the displaying state of the repeat top symbol and the repeat end symbol in the liquid crystal display 12 is recorded as the display top flag data DTF and the display end flag data DEF.

Next, the reading bar data BR is cleared (step 80), and whether the forward (+) key 13 (step 81), the reverse (−) key 14 (step 91) and the mode key 15 (step 98) is turned on or not is checked. If forward (+) key 13 is turned on (step 81) and the display top data DT which is added by "15" is less than a value of the musical score end data ME i.e. the shown end bar of the liquid crystal display 12 does not reach to the end bar of the musical score (step 82), the display top data DT is incremented by "1" (step 85). Therefore according to the display top data DT incremented by "1", musicals core display routine of the steps 44 to 77 described above is executed again, so that the displayed musical score data is shifted forward by one bar in accordance with the turning on of the forward (+) key 13.

Further, if the display top flag data DTF and the display end flag data DEF is "0010" (step 83) and the repeat flag data RF is "01" i.e. the center of the display 12 enters for the first time within the repeat period (step 84), the display top data DT is added to the repeat top data RT (step 86) and the repeat flag data FR is change to "10" i.e. the musical repeat is progressed for the second time within the repeat period (step 87). Therefore, in case the repeat top symbol is not shown on the display 12, the repeat end symbol is shown on the first half area of the display 12 and the repeat progress is the first time of the repeat period. If the forward (+) key 13 is turned on, the repeat top symbol appears at the top of the display 12 as shown in FIG. 13A and changing of the displayed musical score is executed according to the progress of the musical repeat.

If reverse (−) key 14 is turned on (step 91) and the display top data DT is more than "zero" i.e. the shown top bar of the liquid crystal display 12 does not reach to the top of the musical score (step 92), the display top data DT is decremented by "1" (step 95). Therefore according to the display top data DT decremented by "1", musical score display routine of the steps 44 to 77 described above is executed again, so that the displayed musical score data is shifted backward by one bar in accordance with the turning on of the reverse (−) key 14.

Figure 13B:
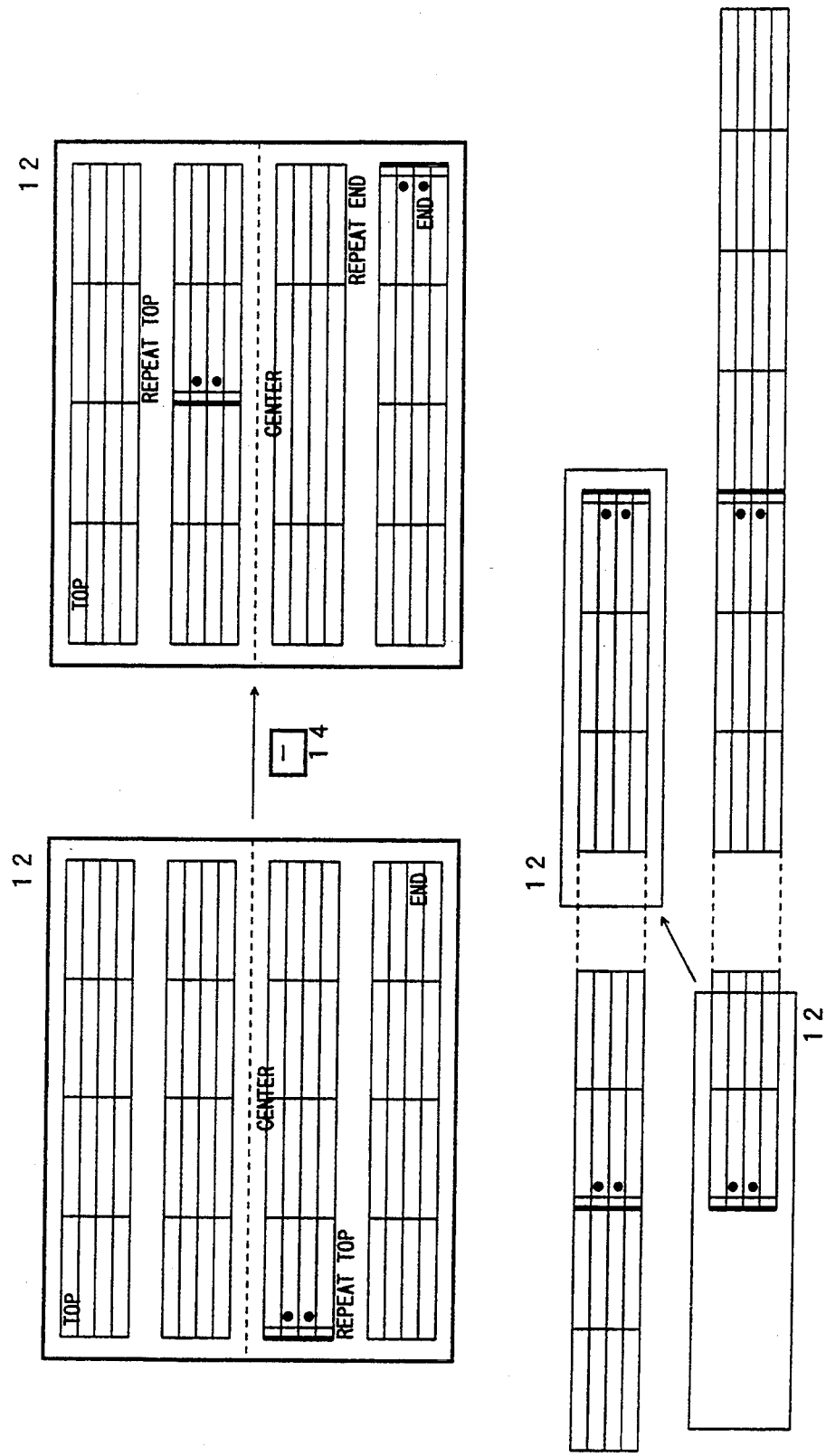

Next, if the display top flag data DTF and the display end flag data DEF is "0100" (step 93) and the repeat flag data RF is "10" i.e. the center of the display 12 enters for the second time within the repeat period (step 94), the display top data DT is changed to the repeat end data RE subtracted by "15" (step 96) and the repeat flat data RF is change to "01" i.e. the musical repeat is progressed for the first time within the repeat period (step 97). Therefore, in case the repeat end symbol is not shown on the display 12, the repeat top symbol is shown on the second half area of the display 12 and the repeat progress is the second time of the repeat period. If the reverse (−) key 14 is turned on, the repeat symbol appears at the end of the display 12 as shown in FIG. 13B, changing of the displayed musical score is executed according to the progress of the musical repeat.

Then, if automatic performance is in progress (step 101), the musical score is in display (step 102) and the time count data TM is equal to or greater than step time data of the note in the playback buffer register 40 (step 103), the musical score data in the playback buffer register 40 is sent to assignment memory (not shown) of the tone generator 27 and a musical tone is sounded (step 104). Further, next musical score data is read from RAM 6 and written to the playback buffer register 40 (step 105), if the read and written musical score data is bar line mark data (step 106), the routine is returned to the step 82. Therefore, whenever the automatic performance is progressed for one bar, the routine of the steps 82 to 87 according to turning on of the forward (+) key 13 is executed, changing of the displayed musical score is carried out according to the progress of the autoplay. If the read and written musical score data is the repeat top symbol data or the repeat end symbol data (step 107), the address data into which musical repeat progress jumps at the repeat period is set as reading address of the musical score data (step 108).

Interrupt Routine

Figure 12:
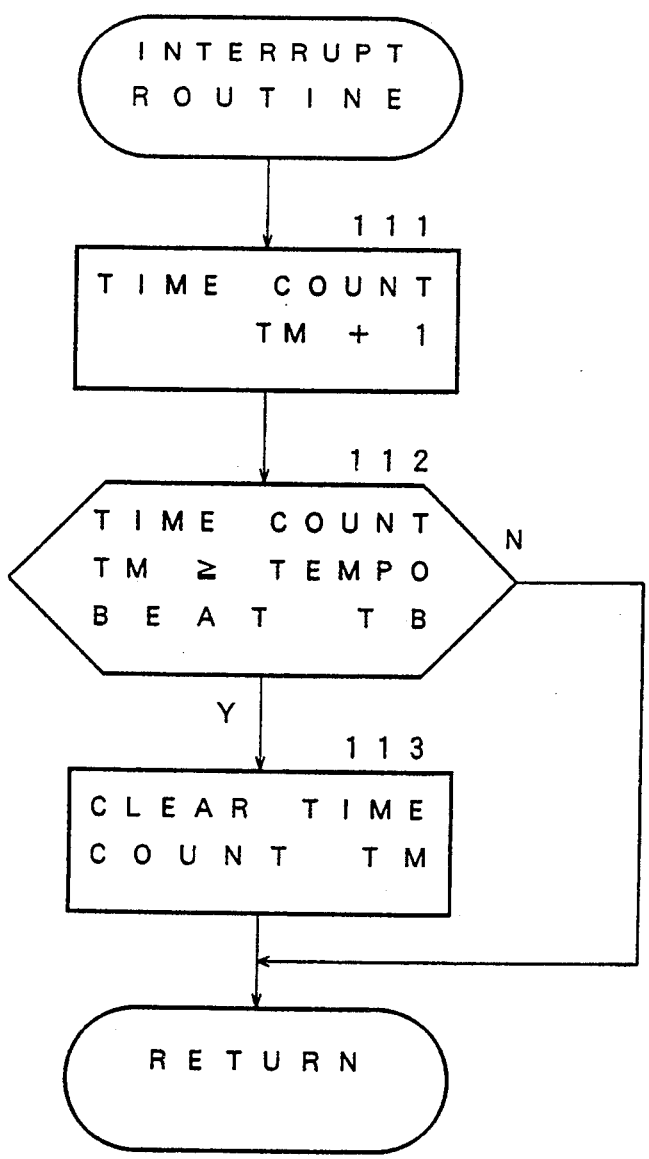
FIG. 12 is a flowchart showing an interrupt routine.

FIG. 12 shows a flowchart an interrupt routine. First the time count data TM is incremented by "1" (step 111). If the time count data TM equals or is more than the tempo beat data TB (step 112), the time count data TM is cleared (step 113).

The above embodiment of the invention is by no means limitative, and various changes and modifications are possible without departing from the spirit and scope of the invention. For example, the musical score data representing symbols may include those indicating meter, syncopation, slur, accent, tempo marks, expression marks, repeat marks, grace, etc., and musical score data representing notes may include those representing dotted notes and divided notes. Further, it is possible to also permit a page shift of the musical score data displayed by the liquid crystal display 12 through any means other than the forward (+) and reverse (−) keys 13 and 14 and foot switch 21, for example, a knee lever, a joy stick, a knob and so forth can be used.

Further, it is possible to realize a progressive musical score data page shift in accordance with the progress of an auto play operation, such as an auto accompaniment or auto rhythm accompaniment. In this case, the processing is delayed after steps 23 and 24 unit an automatic playing of a predetermined number of bars, for example, 4 bars, is ended, and at that point the displayable first bar data m is incremented by "4", and the routine returns to steps 23 and 24. Further, the mode key 15 also may be replaced by the foot switch 21, knee lever, joy stick, knob and so forth.

The list of musical titles displayed by the liquid crystal display 12 may be in any form, for example, katakana, Chinese characters, alphabet letters, numerals and other symbols. Further, it is possible to assemble display symbol patterns in the liquid crystal display 12 and display these display pattern symbols according to musical score data. Further, the liquid crystal display 12 may be replaced by a plasma display, a flat television receiver, and so forth. Further, the memory card 9 may be replaced by a floppy disk, a CD-ROM/RAM and so forth. Further, the musical score display 11 may be removably mounted on an electronic musical instrument.

Further, in the step 86 the display top data DT can be added to the repeat top data RT+"4" (or +"8"), in the step 96 the display top data DT can be changed to the repeat end data RE subtracted by "11" (or "7"). Therefore the repeat top symbol or the repeat end symbol is shown at the center, the top of the second line or the end of the third line of the display 12. Further, the repeat symbol is not only shown on the display 12 but also the repeat top symbol can be shown on the display 12 in the step 83 (the display top flag data DTF="10"). The repeat top symbol is not only shown on the display 12 but also the repeat end symbol can be shown on the display 12 in the step 93 (the display end flag data DEF="01"). Furthermore, the repeat flag data RF, the display top flag data DTF and the display end flag at DEF can be decided according to positional relation between the repeat period and the top, the top of the second line, the end of the third line or the end of the display 12. And then, the repeat top data RT is able to represent an order of a repeat top symbol (bar) from the top bar of whole musical score, the repeat end data RE is able to represent an order of a repeat end symbol (bar) from the top bar of the whole musical score. Further, the display on liquid crystal display 12 can be other than 4 bars×4 lines.

I claim:

1. A musical score display comprising:

storage means for storing musical score data representing a musical score of a piece of music, wherein the musical score data includes at least two musical repeat data in which a musical performance is repeated therebetween;

display instructions means for instructing a display of musical score data stored in said storage means;

first detection means for detecting an instruction by said display instruction means;

reading means for reading the musical score data from said storage means according to the detection by said first detection means;

converting means for converting the musical score data read by said reading means into data for display;

display means for displaying the data converted by said converting means;

change instruction means for instructing a change of the musical score data displayed by said display means;

second detection means for detecting an instruction by said change instruction means;

first read control means for instructing said reading means to read musical score data other than the musical score data displayed by said display means according to detection by said second detection means;

repeat detection means for detecting display of the at least two musical repeat data on said display means; and second read control means for instructing said reading means to read musical score data corresponding to a repeat progress of the at least two musical repeat data displayed on said display means according to detection by said repeat detection means.

2. The musical score display of claim 1, wherein said display instruction means instructs a reading of musical score data.

3. The musical score display of claim 1, wherein said change instruction means instructs a change in musical score data read by said reading means.

4. The musical score display of claim 1, wherein said change instruction means executes a forward/reverse operation with respect to musical score data displayed by said display means.

5. The musical score display of claim 1, wherein said storage means stores musical score data of a plurality of pieces of music and title data representing titles of said pieces of music, the musical score display further comprising second reading means for reading the title data and second converting means for converting the title data read by said second reading means into data for display, and said display means displays the title data converted by said converting means.

6. The musical score display of claim 5, further comprising selecting means for selecting the title data displayed by said display means.

7. The musical score display of claim 6, wherein said reading means reads musical score data corresponding to the title data selected by said selecting means from said storage means.

8. The musical score display of claim 1, wherein said storage means is removably mountable to the musical score display.

9. The musical score display of claim 1, wherein said change instruction means instructs a change of the musical score data displayed by said display means in accordance with a progress of automatic playing.

10. A method of displaying musical score comprising the steps of:

(a) storing musical score data representing a musical score of piece of music, wherein the musical score data includes at least two musical repeat data in which musical performance is repeated therebetween;
(b) instructing a display of the stored musical score data of said step (a);
(c) detecting said display instruction of said step (b);
(d) reading out said stored musical score data according to detection of said display instruction of step (c);
(e) converting said read musical score data of said step (d) into data for display;
(f) displaying said converted data of said step (e);
(g) instructing a change in the displayed musical score data of said step (f);
(h) detecting said change instruction of said step (g);
(i) reading musical score data other than said displayed musical score data, according to detection of said change instruction of step (h);
(j) converting said read musical score data of said step (i) into data for display;
(k) displaying said converted data of said step (j);
(l) detecting display of the at least two musical repeat data in the displaying of said step (f) or (k);
(m) instructing reading of said stored musical score data corresponding to a repeat progress of the at least two musical repeat data displayed in said step (f) or (k) according to the display detection in said step (l);
(n) converting said read musical score data of said step (m) into data for display; and
(o) displaying said converted data of said step (n).

11. The method of displaying musical score of claim 10, wherein said step (b) instructs reading of musical score data.

12. The method of displaying musical score of claim 10, wherein said step (g) instructs a change in said read musical score data.

13. The method of displaying musical score of claim 10, wherein said step (g) executes forward/reverse operation with respect to displayed musical score data.

14. The method of displaying musical score of claim 10, wherein said step (a) stores musical score data of a plurality of pieces of music and title data representing titles of said pieces of music, the method of displaying musical score further comprising the steps of:
(p) reading said title data; and
(q) converting the read title data into data for display and displaying said converted title data in said step (f).

15. The method of displaying musical score of claim 14, further comprising the step of (r) selecting the displayed converted title data.

16. The method of displaying musical score of claim 15, wherein stored musical score data corresponding to the selected title data is displayed in step (d).

17. The method of displaying musical score of claim 10, wherein said step (g) instructs change in the displayed musical score data in accordance with a progress of an automatic playing.

18. The musical score display of claim 1, wherein said second read control means instructs said reading means to read and display a first of the at least two musical repeat data, if a second of the at least two musical repeat data is displayed in said display means.

19. The musical score display of claim 18, wherein the first musical repeat data is repeat top data, and the second musical repeat data is repeat end data.

20. The musical score display of claim 18, wherein the first musical repeat data is repeat end data, and the second musical repeat data is repeat top data.

21. The method of displaying musical score of claim 10, wherein said step (m) instructs reading and displaying of a first of the at least two musical repeat data, if a second of the at least two musical repeat data is displayed in said step (f) or (k).

22. The method of displaying musical score of claim 21, wherein the first musical repeat data is repeat top data, and the second musical repeat data is repeat end data.

23. The method of displaying musical score of claim 21, wherein the first musical repeat data is repeat end data, and the second musical repeat data is repeat top data.

* * * * *